United States Patent [19]
Webster

[11] Patent Number: 6,007,353
[45] Date of Patent: Dec. 28, 1999

[54] ELECTRICAL CONNECTOR ENCLOSURE

[76] Inventor: Stephen L. Webster, 1403 Griswold St., Port Huron, Mich. 48060

[21] Appl. No.: 09/064,538

[22] Filed: Apr. 22, 1998

[51] Int. Cl.⁶ .................................................. H01R 13/14
[52] U.S. Cl. ........................................... 439/142; 439/544
[58] Field of Search .................................. 439/544, 147, 439/38, 142, 136, 135; 220/3.8; 174/67, 66

[56] References Cited

U.S. PATENT DOCUMENTS

| | | | |
|---|---|---|---|
| 2,439,708 | 4/1948 | Abraham | 200/50 |
| 2,987,909 | 6/1961 | Shlank | 70/168 |
| 3,131,985 | 5/1964 | Blonder | 200/50 |
| 3,140,344 | 7/1964 | Slater et al. | 174/67 |
| 4,291,817 | 9/1981 | Spitzer et al. | 220/327 |
| 4,584,856 | 4/1986 | Petersdorf et al. | 70/57 |
| 4,632,269 | 12/1986 | Rose | 220/3.8 |
| 4,674,813 | 6/1987 | Feldner | 439/133 |
| 5,228,584 | 7/1993 | Williams, Jr. | 220/3.8 |
| 5,243,135 | 9/1993 | Shotey | 174/67 |
| 5,271,514 | 12/1993 | Ahlskog | 220/3.8 |
| 5,391,837 | 2/1995 | Carey | 174/50 |
| 5,456,373 | 10/1995 | Ford | 220/242 |
| 5,456,377 | 10/1995 | Williams, Jr. | 220/3.8 |
| 5,773,760 | 6/1998 | Stark et al. | 174/66 |

*Primary Examiner*—Alexander Gilman
*Attorney, Agent, or Firm*—Harness, Dickey & Pierce, P.L.C.

[57] ABSTRACT

An electrical connector enclosure is provided for housing at least one electrical component. The electrical connector enclosure comprises a housing (such as a standard electrical box), a mounting base, and a plate for enclosing the housing. The mounting base includes a frame that extends around the perimeter of a cavity in the housing and a ledge formed along the inner edge of the frame for engaging the plate. In addition, the ledge is further defined to include a radially extending section at each corner of the frame with a hole formed therein, such that these holes align with apertures from a box extension hole pattern of a typical electrical box. Prepunched plates are formed with a similar hole pattern and are configured with slots that expose different types of electrical components. For assembly, a plurality of fasteners pass through the holes in both the plate and the mounting base and into the apertures of the housing, thereby immovably attaching the plate to the mounting base as well as the mounting base to the electrical box. Extending between the radially extending sections of the frame are a top shelf and a bottom shelf that slidably engaging the electrical components. When the plate is attached to the mounting base, the electrical components are immovably secured between the shelves and the plate. Finally, a cover dimensioned to substantially cover the plate can be pivotably connected to the mounting base.

21 Claims, 6 Drawing Sheets

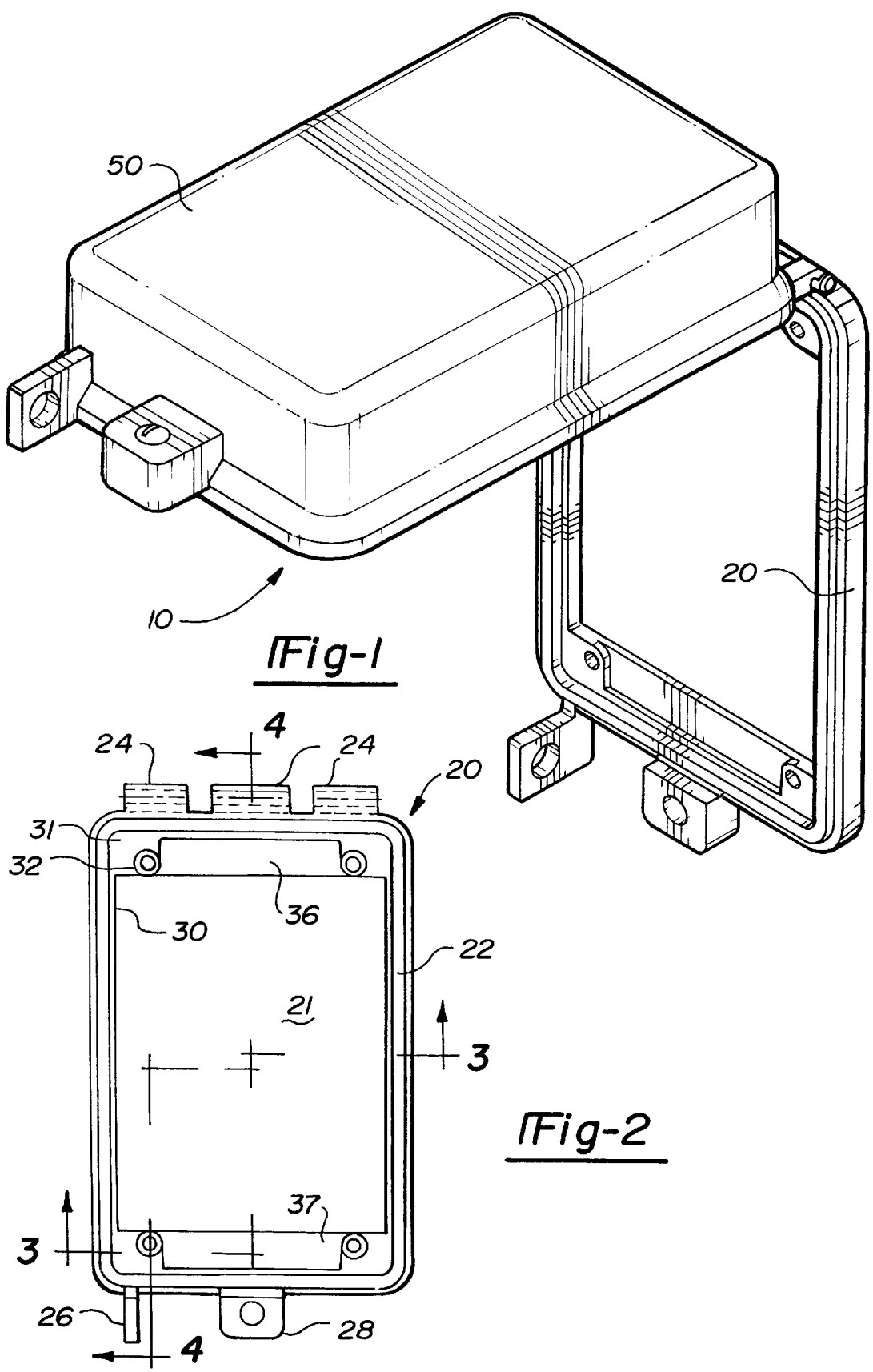

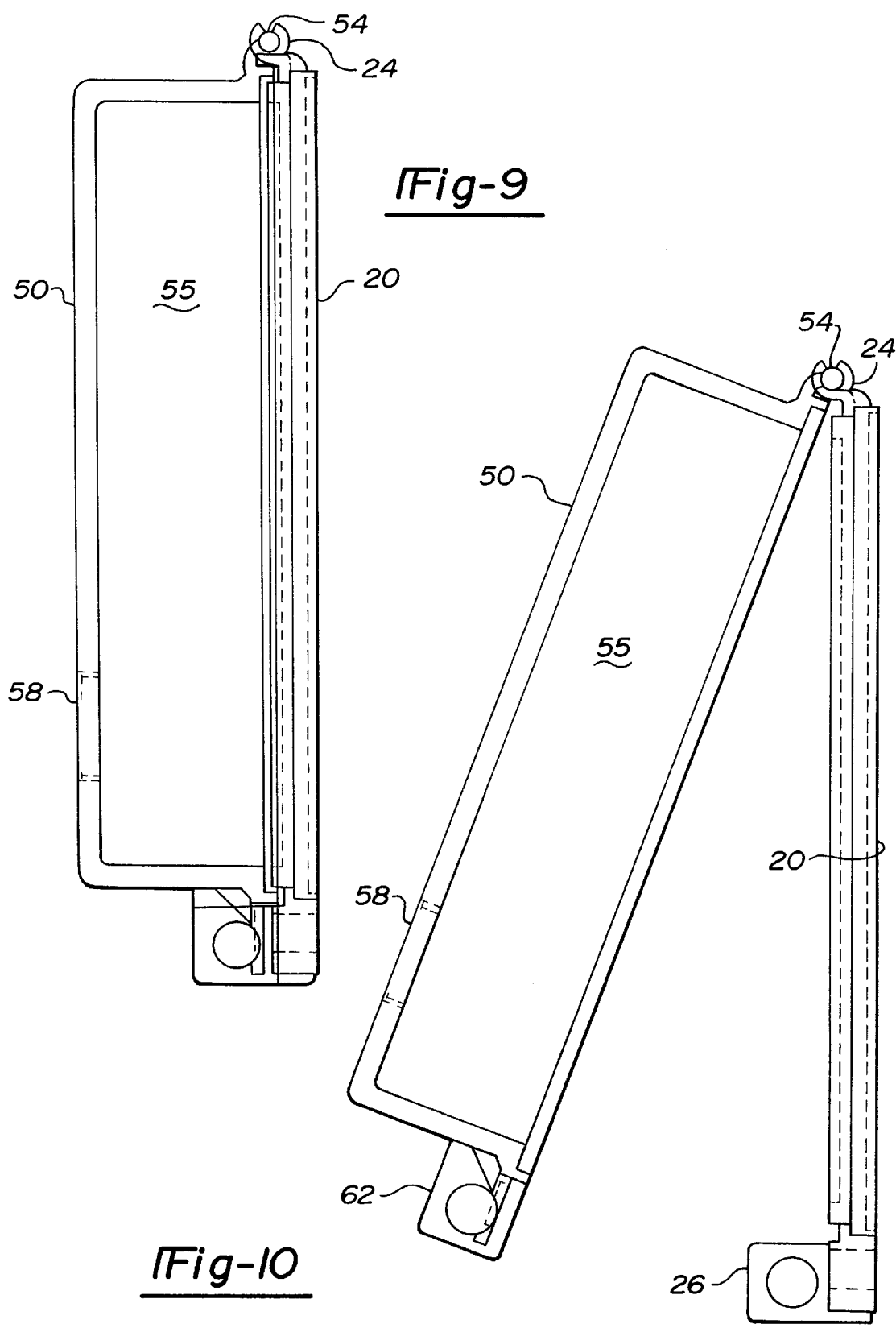

ELECTRICAL CONNECTOR ENCLOSURE

BACKGROUND OF THE INVENTION

1. Field of the Invention

The present invention relates to an electrical connector enclosure for housing electrical components, and more particularly to a mounting assembly with an open design to facilitate multiple configurations of electrical components secured inside an electrical enclosure, including a waterproof cover.

2. Discussion

Waterproof electrical boxes are well known in the industry for housing a variety of electrical receptacles and other electrical connector components. Electrical boxes are often situated on programmable logic controllers (PLC), computer numeric control (CNC) machines or other industrial equipment, and thus are exposed to contamination from dirt, water or other foreign substances found in an industrial setting. Depending on the particular situation, the protection provided by the electrical box may be required to meet various industry or government safety standards. Furthermore, each electrical box may accommodate ground fault interrupters, duplex receptacles, various types of communication ports (e.g., 25-pin DB25 or 9-pin DB-9 connectors) and other communication devices (i.e, floppy disk drive, fiber optic components, ect.).

These electrical boxes are also accessible to numerous machinists and repairmen, including some unauthorized personnel. It is necessary to provide a tamper proof design, including a suitable locking mechanism to control access to the electrical connectors contained within these boxes.

Therefore, it is desirable to provide a cost effective mounting assembly for attachment to a standard electrical box. The mounting assembly uses an open design, including prepunched configuration plates, to accommodate multiple configurations and flexible positioning of various electrical components. It is also desirable to provide a deep, protective weather-tight cover pivotally hinged to the mounting base and lockable by either a padlock placed through aligning hasps or by a pre-mounted tumbler camlock. To achieve industry or government safety standards, a captive screw may be used to compress sealing gaskets, and thus secure the cover to the mounting base.

SUMMARY OF THE INVENTION

This invention is directed to an electrical connector enclosure for housing at least one electrical component. The electrical connector enclosure comprises a housing (such as a standard electrical box), a mounting base, and a plate for enclosing the housing. The mounting base includes a frame that extends around the perimeter of a cavity in the housing and a ledge formed along the inner edge of the frame for engaging the plate. In addition, the ledge is further defined to include a radially extending section at each corner of the frame with a hole formed therein, such that these holes align with apertures from a box extension hole pattern of a typical electrical box. Prepunched plates are formed with a similar hole pattern and are configured with slots that expose different types of electrical components. For assembly, a plurality of fasteners pass through the holes in both the plate and mounting base and into the apertures, thereby immovably attaching the plate to the mounting base and the mounting base to the electrical box. Extending between the radially extending sections of the frame are a top shelf and a bottom shelf that slidably engaging the electrical components. When the plate is attached to the mounting base, the electrical components are immovably secured between the shelves and the plate. Finally, a cover dimensioned to substantially cover the plate can be pivotably connected to the mounting base.

These and other advantages and features of the present invention will become readily apparent from the following detailed description, claims and drawings.

BRIEF DESCRIPTION OF THE DRAWINGS

The drawings, which form an integral part of the specification, are to be read in conjunction therewith, and like reference numerals are employed to designate identical components in the various views:

FIG. 1 is a perspective view showing a preferred embodiment of the mounting assembly of the present invention;

FIG. 2 is a top view illustrating a mounting base used in the mounting assembly of the present invention;

FIG. 9 is a side view of the cover in a closed position being attached to the mounting base of the present invention;

FIG. 10 is a side view of the cover in an open position being attached to the mounting base of the present invention.

DETAILED DESCRIPTION OF THE PREFERRED EMBODIMENTS

A mounting assembly 10 for attaching to a typical electrical box (not shown) is illustrated in FIG. 1. Mounting assembly 10 includes a mounting base 20 and a cover 50 for housing numerous types of electrical connectors, communication devices or other electrical components.

Figure 3:
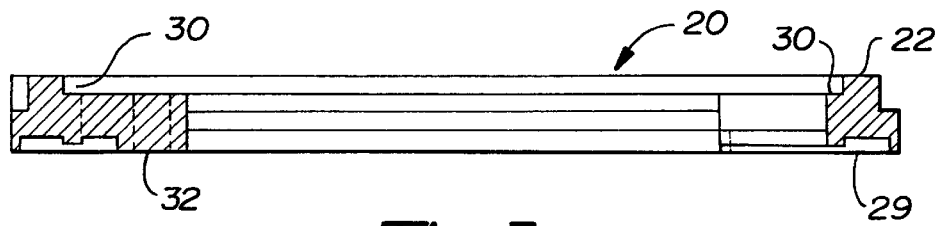
FIG. 3 is a front view, taken along line 3—3 of FIG. 2, of the mounting base used in the mounting assembly of the present invention.
Figure 4:
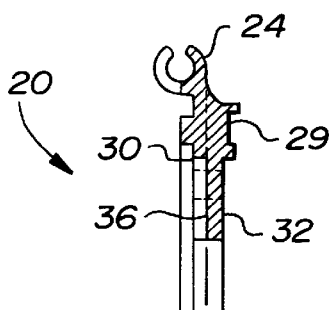
FIG. 4 is a side view, taken along line 4—4 of FIG. 2, of the mounting base used in the mounting assembly of the present invention.

Mounting base 20 is constructed as a frame 22, having a recess 21 therein as shown in FIG. 2. The frame 22 is dimensioned to extend about the perimeter of the opening in a standard electrical box. It is envisioned that the frame 22 may be dimensioned to fit different types and sizes of electrical enclosures. Along the outer edge of the top side of frame 22 are three receiving hinges 24 formed thereon for pivotably connecting to cover 50. On the outer edge of the bottom side of frame 22 is attached a locking hasp 26 and a captive screw retainer 28. In addition, FIGS. 3 and 4 show a channel 29 formed into the bottom edge of each side of frame 22 which serves as a mounting area for a compression gasket (not shown). Using a mounting gasket will provides a seal between mounting base 20 and the top edge of box 12.

A ledge 30 runs along the inner edge of frame 22 for engaging various prepunched configuration plates. A hole 32 is formed in a radially extending section 31 of ledge 30 at each corner of frame 22 for securing the mounting base 20 to the standard electrical box 12. The mounting base hole pattern (approximately 3.625" on center) aligns with the "box extension" hole pattern of a standard electrical box 12, as opposed to the standard device mount (approximately 3.25" on center) used by typical mounting assemblies. Between the corresponding radially extending sections 31, a top shelf 36 extends along the top side of frame 22 and a bottom shelf 37 extends along the bottom side of frame 22 which are each further offset from the ledge 30 for slidably engaging at least one electrical component. Because the mounting holes 32 are spaced farther apart on the mounting base 20, a more usable area is provided by the top shelf 36 and bottom shelf 37 for mounting electrical components within box 12. As will be apparent to one skilled in the art, the dimensions for the hole pattern may vary without limiting the broader aspects of the present invention. The "open" layered design approach of a mounting base 20 having a ledge 30 along with a top shelf 36 and bottom shelf 37 is best seen in FIG. 3. It should also be noted that there is no lip protruding upwards from the mounting base 20 which is customarily found in other weather tight electrical enclosures. Therefore, the present invention can be universally used for European and/or Asian style receptacles where a power cord might be required to extend at a 90 degree angle from the enclosure.

Figure 5:
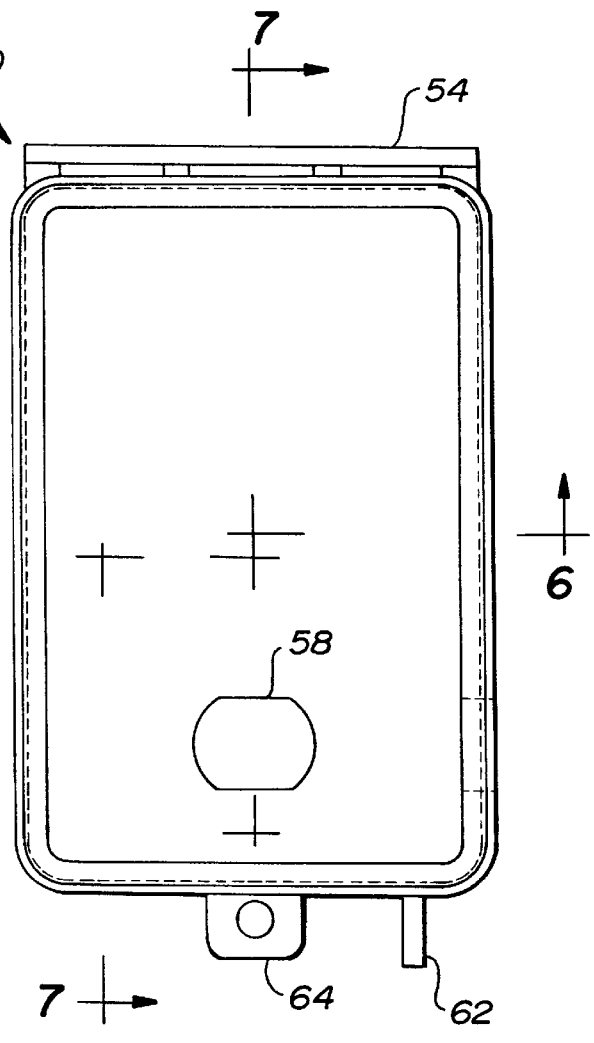
FIG. 5 is a top view illustrating a cover used in the mounting assembly of the present invention.
Figure 6:
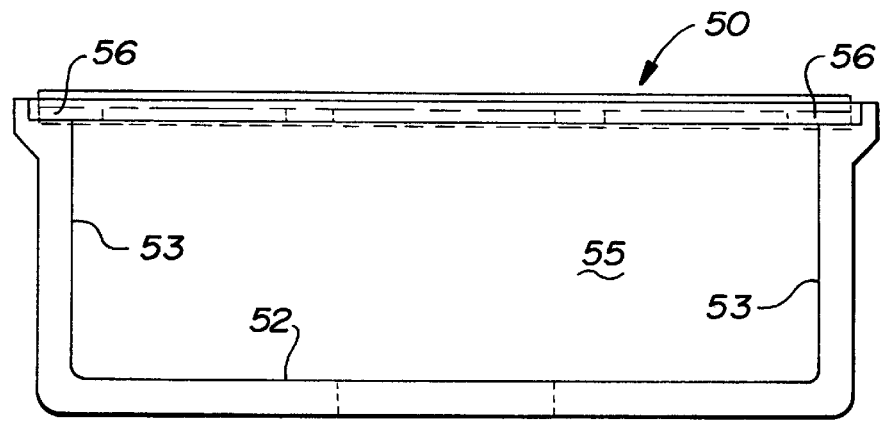
FIG. 6 is a front view, taken along line 6—6 of FIG. 5, of the cover used in the mounting assembly of the present invention.
Figure 7:
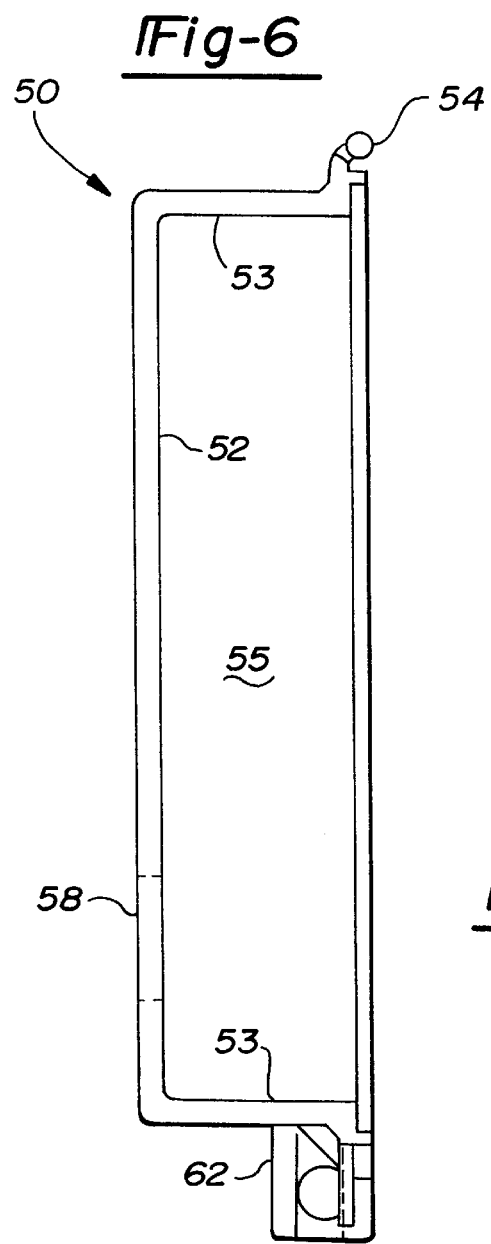
FIG. 7 is a side view, taken along line 7—7 of FIG. 5, of the cover used in the mounting assembly of the present invention.

Referring to FIG. 5, a cover 50 may be optionally attached to the mounting base 20 for enclosing the exposed portions of any electrical components. The cover 50 is dimensioned to substantially cover the area defined by the frame 22. A pin 54 is coupled along the outer edge of the top side of the cover 50, such that it snaps into receiving hinges 24 to pivotably connect the cover 50 to the mounting base 20. It is also envisioned that other means may be used to pivotably connect the cover 50 to the mounting base 20. FIGS. 6 and 7 show the cover 50 having a top wall 52 with four side walls 53 defining a cavity 55 therein. The cavity 55 is deep enough to allow a variety of electrical connectors to be mounted beneath the cover 50 without obstructing its operation.

To engage the mounting base 20, a groove 56 is formed into the inner edge of each of the four walls 53 of the cover 50. The groove 56 also serves as the mounting area for a second compression gasket (not shown). Because the cover 50 has been designed to substantially cover the mounting base 20, the groove 56 is the same size as the channel 29 formed in the mounting base 20. As a result, a single sized gasket can be used between the mounting base 20 and the box 12, as well as between the mounting base 20 and the cover 50, thereby reducing manufacturing costs for the present invention.

Figure 8:
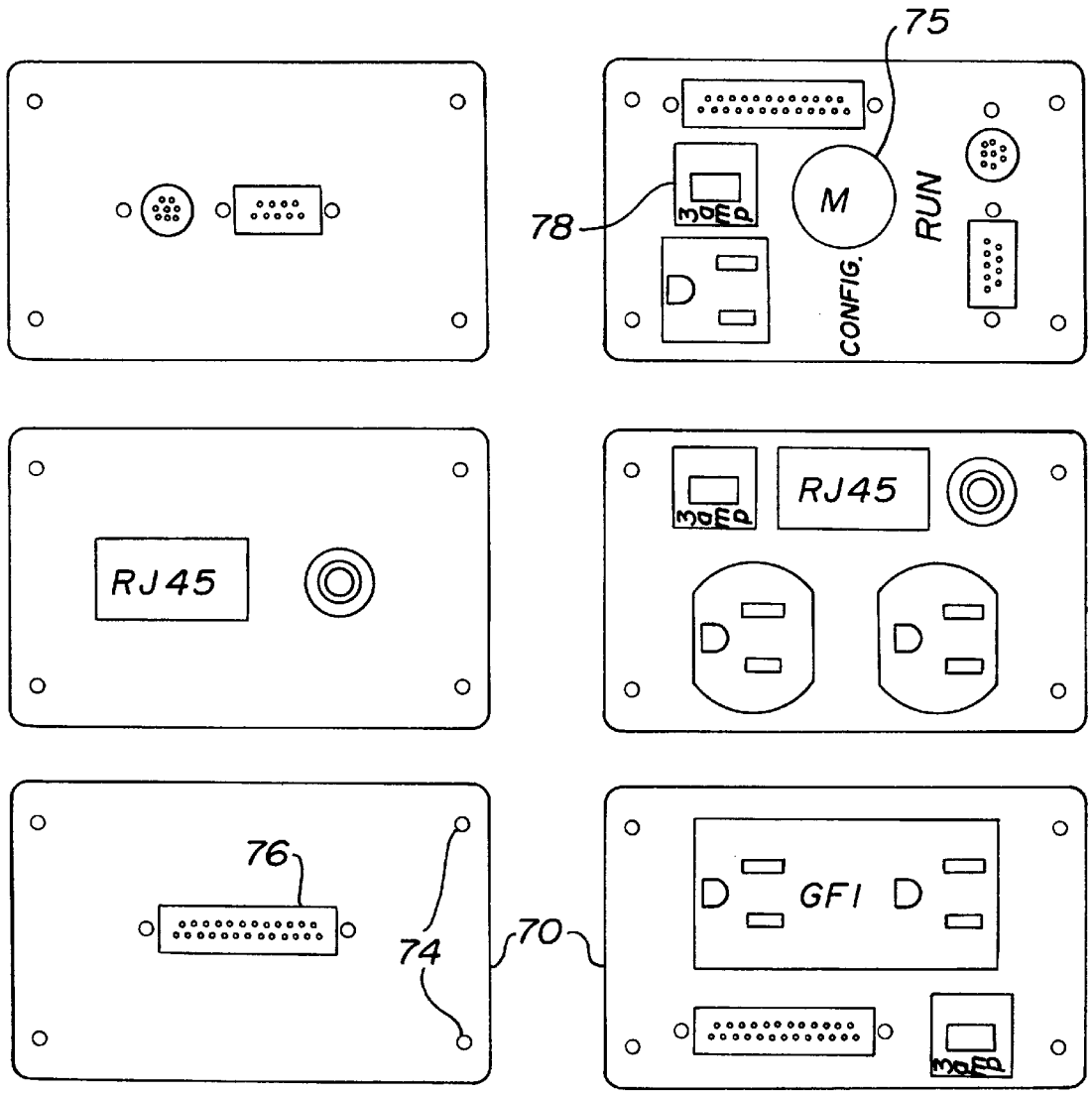
FIG. 8 is a illustration of various types of configuration plates and corresponding electrical components that can be used with the present invention.
Figure 11:
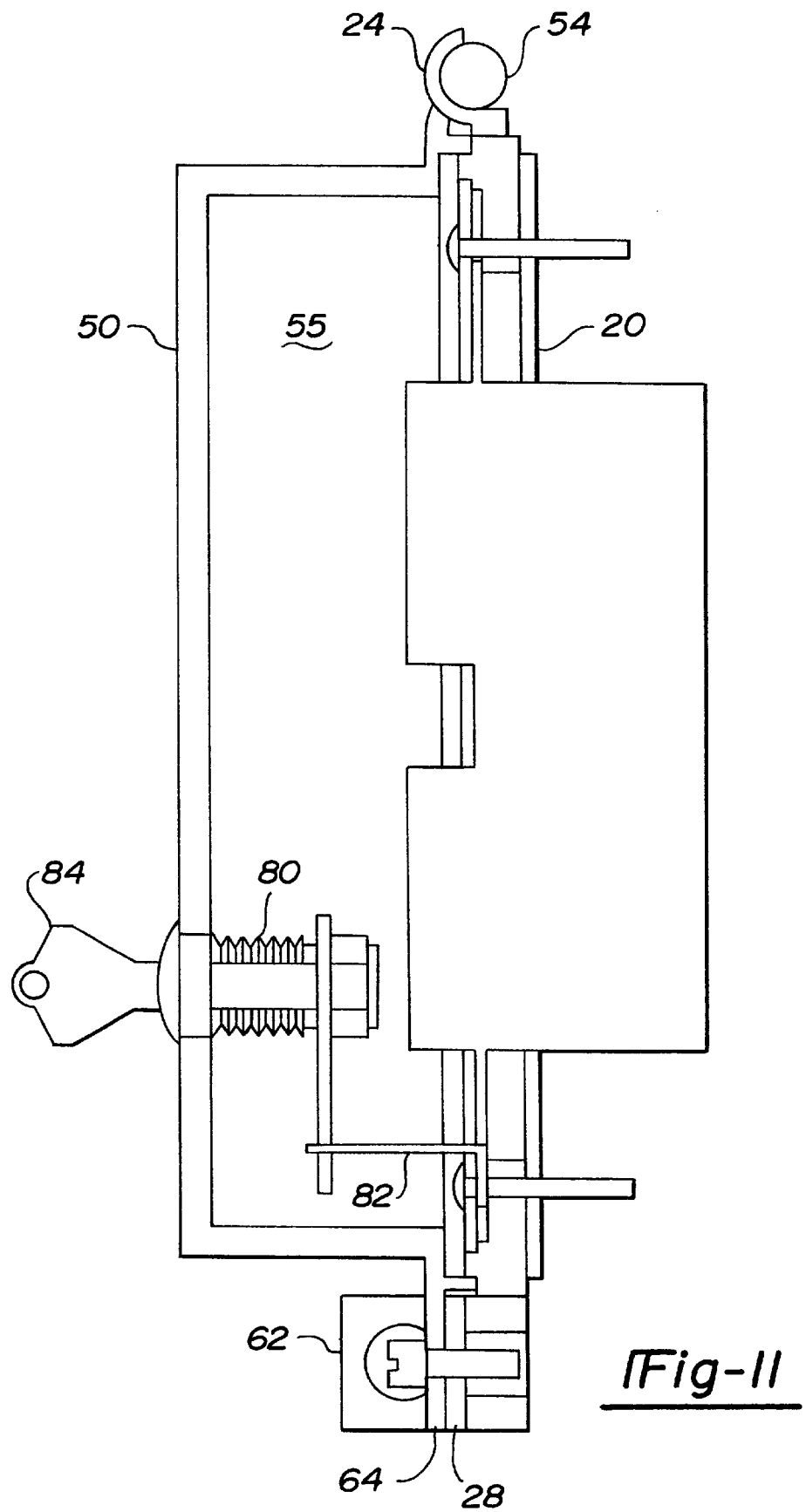
FIG. 11 is a side view illustrating a locking mechanism and a bracket coupled to the mounting base of the present invention.

Referring to FIG. 5, a predefined knockout 58 is centered along the lower half of the cover 50 which allows for ease of installation of a camlock (not shown). One skilled in the art will recognize that the predefined knockout 58 reduces production costs by eliminating an additional manufacturing run for covers needing a hole for camlock locking mechanism 80 installation. Installation of a camlock into the mounting assembly 10 includes mounting a bracket 82 onto the mounting base 20 as shown in FIG. 11. This locking mechanism 80 is operable with a key 84 for rotating the camlock 86 to engage the bracket 82, and thus restrict access to the enclosed electrical components. In some applications, a tumbler switchlock 75 (as seen in FIG. 8) for run/program modes may be enclosed as an electrical component inside the present invention. The key for switching between these modes can also be used for operating an installed camlock, thus allowing one key for lockout and programming purposes.

Furthermore, a locking hasp 62 and a retainer flange 64 are coupled on the outer edge of the bottom side of the cover 50 to provide additional locking mechanisms. When the cover 50 is in a closed position, the hasp 62 aligns with the hasp 26 of the mounting base 20 to facilitate the use of a locking device, such as a padlock, and flange 64 aligns with retainer 28 of mounting base 20 which allows for the sealing of compression gaskets via a captive screw.

For assembly, mounting base 20 with optionally attached compression gasket is placed on the top edge of a standard electrical box 12, such that each hole 32 aligns with the corresponding hole in the "box extension" hole pattern. An electrical component can be flexibly positioned into box 12 by resting its flanges on first shelf 36 and second shelf 37. It is envisioned that more than one electrical component could be arranged in the mounting assembly 20 of the present invention.

Next, a flat configuration plate 70 is placed over the electrical component, and thereby immovably interposing the electrical components between plate 70 and mounting base 20. The offset between the top shelf 36 and bottom shelf 37, and ledge 30 is sized to correspond to the height of a typical flange on a electrical component (i.e., approximately 0.062"). Referring to FIG. 8, each prepunched configuration plate 70 includes at least one slot for exposing the connector portion of each electrical components and mounting holes 74 aligning with those of mounting base 20. Various types of fasteners known to those skilled in the art, including threaded screws, are then passed through the mounting holes 74 of the configuration plate 70 and the mounting holes 32 of the mounting base 20 into the receiving apertures of a standard electrical box. Unlike many standard electrical enclosures, one person installation of the mounting assembly 10 of the present invention can be accomplished by means of using four J clips.

It is also envisioned that electrical components may be mounted directly into the prepunched configuration plate 70 with or without other electrical component being interposed between plate 70 and mounting base 20. For instance, 25-pin DB25 connector 76 or a 3 amp circuit breaker 78 could insert into a hole punched into plate 70 as shown in FIG. 8. Examples of different types of configuration plates and corresponding electrical components are illustrated in FIG. 8. Therefore, the "open" design of the present invention allows flexibility for various prepunched configuration plates to be swapped in and out with the same mounting assembly 10.

Cover 50 snaps into mounting base 20, and thus eliminates extra mounting parts for attaching cover 50. By having the mounting screws within the confines of cover 50, the present invention provides a tamper proof design. In operation, cover 50 pivots between an open position and a closed position as shown in FIGS. 9 and 10, respectively. Depending on the particular application, the cover 50 can be rotated up to approximately 270 degrees in the open position. In a closed position, as will be apparent to one skilled in the art, various types of captive screws may be used to seal compression gaskets implemented in mounting assembly 10. To prevent accidental pull out, captive screw retainer 28 is positioned underneath the retainer flange 64. Use of captive screws to compress gaskets allows for nema 4 (washdown) and/or nema 12 (oil and dust) ratings for the electrical connector enclosure of the present invention. In those applications requiring a nema 4 (washdown) rating, knockout 52 should not be removed for use with a camlock, unless the opening can be properly sealed. One skilled in the art will appreciate that other hardware means (ie., butterfly latch, ect.) may be used to compress the gaskets.

While specific embodiments have been shown and described in detail to illustrate the principles of the present invention, it will be understood that the invention may be embodied otherwise without departing from such principles. For instance, an alternative embodiment may comprise the mounting assembly of the present invention being mounted into a prepunched opening in a panel of an industrial machine. In a another embodiment, the mounting assembly may be adapted to fit a larger electrical box (e.g., two or three gang box). One skilled in the art will readily recognize from such discussion and from the accompanying drawings and claims that other various changes, modifications and variations can be made therein without departing from the spirit and scope of the invention as described in the following claims.

What is claimed is:

1. An electrical connector enclosure for housing at least one electrical component, comprising:

a housing having a top wall, a bottom wall, two side walls and a rear wall defining a cavity therein, and a plurality of apertures formed therein;

a plate for enclosing said housing, having a plurality of holes that align with said plurality of apertures and at least one slot for exposing at least a portion of the electrical component;

a mounting base for attaching to said housing, said mounting base includes a frame having a top member, a bottom member and two side members dimensioned to extend about the perimeter of said cavity with a recess therein, and a ledge formed along an inner edge of said frame for engaging said plate;

said ledge further includes a top shelf, a bottom shelf, and an inwardly protruding flange positioned at each corner of said frame with a hole formed therein, such that each of said holes aligns with one of said plurality of apertures of said housing, whereby a plurality of fasteners may connect through said holes and said apertures for immovably attaching said plate to said mounting base and to said housing; and said top shelf defining a depression in the body of said ledge which extends along the top member of said frame between two of said protruding flanges for slidably engaging the electrical components, and said bottom shelf defining a second depression in the body of said ledge which extends along the bottom member of said frame between two of said protruding flanges for slidably engaging the electrical components, whereby the electrical components are immovably secured when said plate is attached to said mounting base.

2. The electrical connector enclosure of claim 1 wherein said housing is further defined as a standard electrical box and said holes of said mounting base align with said plurality of aperatures that form a box extension hole pattern of said box.

3. The electrical connector enclosure of claim 1 further comprising a retainer flange coupled to said cover and a captive screw retainer coupled to said mounting base for mounting of a captive screw.

4. The electrical connector enclosure of claim 3 wherein said mounting base includes a channel formed in a bottom edge of said frame with a first gasket mounted therein for engaging said housing, and said cover includes a groove formed therein with a second gasket mounted therein for engaging said mounting base, whereby tightening said captive screw compresses said gaskets and seals the electrical connector enclosure.

5. The electrical connector enclosure of claim 1 further comprising a cover dimensioned to substantially cover said plate and pivotably connects to said mounting base.

6. The electrical connector enclosure of claim 5 wherein said cover is further defined as a base plate with four side walls forming a cavity therein.

7. The electrical connector enclosure of claim 5 wherein said frame further defined as having at least one receiving hinge formed thereon, and said cover having a pin coupled thereto, whereby said pin snaps into said receiving hinge to pivotably connect said cover to said mounting base.

8. The electrical connector enclosure of claim 5 further comprising a first hasp coupled to said cover and a second hasp coupled to said mounting base, whereby said first hasp aligns with said second hasp when said cover is in a pivotably closed position, thereby facilitating locking of the enclosure.

9. The electrical connector enclosure of claim 5 further comprising a locking mechanism secured through an opening in said cover and a bracket coupled to said mounting base, said locking mechanism operable with a key for rotating said locking mechanism to engage said bracket, thereby controlling access to the enclosure.

10. The electrical connector enclosure of claim 9 wherein at least one of the electrical components installed in the electrical enclosure includes a switch that is operable by said key.

11. A mounting assembly for enclosing at least one electrical component into an opening in a panel of an industrial machine, comprising:

a mounting base for attaching to the panel, said mounting base includes a frame having a top member, a bottom member and two side members dimensioned to extend about the perimeter of the opening with a recess therein and a first connection means for coupling said mounting base to the panel;

a plate that engages a ledge formed along an inner edge of said frame to enclose said recess, said plate having at least one slot for exposing at least a portion of the electrical component and a second connection means for attaching said plate to said mounting base; and said ledge includes a top shelf and a bottom shelf, said top shelf defining a depression in the body of said ledge which extends along an inner edge of said top member for slidably engaging the electrical components and said bottom shelf defining a second depression in the body of said ledge which extends along an inner edge of said bottom member for slidably engaging the electrical components, whereby the electrical components are immovably secured between said plate and said top and bottom shelves when said plate is attached to said mounting base.

12. The mounting assembly of claim 11 wherein said first connection means for coupling said mounting base to the panel includes a radially extending section at each corner of said frame with a hole formed therein, whereby a plurality of fasteners pass through said holes to couple said mounting base to the panel.

13. The mounting assembly of claim 11 wherein said second connection means for attaching said plate to said mounting base includes a hole formed therein at each corner of said plate, whereby a plurality of fasteners pass through said holes to couple said plate to said mounting base and to said panel.

14. The mounting assembly of claim 11 further comprising a cover dimensioned to substantially cover said plate and pivotably connected to said mounting base.

15. The mounting assembly of claim 14 wherein said frame further defined as having at least one receiving hinge formed thereon, and said cover having a pin coupled thereto, whereby said pin snaps into said receiving hinge to pivotably connect said cover to said mounting base.

16. The mounting assembly of claim 14 further comprising a locking mechanism secured through an opening in said cover and a bracket coupled to said mounting base, said locking mechanism operable with a key for rotating said locking mechanism to engage said bracket, thereby controlling access to the mounting assembly.

17. The mounting assembly of claim 16 wherein at least one of the electrical components installed onto said mounting base includes a switch that is operable by said key.

18. The mounting assembly of claim 14 further comprising a retainer flange coupled to said cover and a captive screw retainer coupled to said mounting base for mounting of a captive screw.

19. The mounting assembly of claim 18 wherein said mounting base includes a channel formed in a bottom edge of said frame with a first gasket mounted therein for engaging the opening, and said cover includes a groove formed therein with a second gasket mounted therein for engaging said mounting base, whereby tightening said captive screw seals said gaskets.

20. A mounting assembly for attaching at least one electrical component into an opening of an electrical enclosure, the enclosure having a plurality of flanges with a plurality of apertures formed therein, comprising:

a mounting base for attaching to the electrical enclosure, said mounting base includes a frame having a top member, a bottom member and two side members dimensioned to extend about the perimeter of the opening having a recess therein, and a ledge formed along an inner edge of said frame for slidably engaging the electrical components;

a plate for enclosing the opening, said plate having a plurality of holes that align with the plurality of apertures and at least one slot for exposing at least a portion of the electrical component;

said ledge further includes a top shelf, a bottom shelf, an extending section at each corner of said frame with a hole formed therein, such that each of said holes aligns with one of the plurality of apertures, whereby a plurality of fasteners may connect through the plurality of apertures for immovably attaching said plate to said mounting base and to the electrical enclosure, thereby immovably securing the electrical components between said plate and said ledge;

said top shelf defining a depression in the body of said ledge which extends along an inner edge of said top member for slidably engaging the electrical components and said bottom shelf defining a second depression in the body of said ledge which extends along an inner edge of said bottom member for slidably engaging the electrical components, whereby the electrical components are immovably secured between said plate and said top and bottom shelves when said plate is attached to said mounting base; and a cover being dimensioned to substantially cover said plate and pivotably connects to said mounting base.

21. The mounting assembly of claim 20 wherein said electrical enclosure is further defined as a standard electrical box and said holes of said mounting base align with the plurality of aperatures that form a box extension hole pattern for said box.

* * * * *